United States Patent
Sharman

Patent Number: 5,848,196
Date of Patent: Dec. 8, 1998

[54] IMAGE PROCESSING TO COMPENSATE FOR ASYMMETRIC RESOLUTION

[75] Inventor: Richard Arthur Sharman, Dunstable, England

[73] Assignee: Eastman Kodak Company, Rochester, N.Y.

[21] Appl. No.: 931,234

[22] Filed: Sep. 15, 1997

Related U.S. Application Data

[63] Continuation of Ser. No. 451,323, May 26, 1995.

[30] Foreign Application Priority Data

May 28, 1994 [GB] United Kingdom ............... 941078

[51] Int. Cl.$^6$ ............... G06K 9/40; H04K 1/40
[52] U.S. Cl. ............... 382/260; 358/447; 382/263
[58] Field of Search ............... 382/256, 260–266; 348/606, 625–631

[56] References Cited

U.S. PATENT DOCUMENTS

| | | | |
|---|---|---|---|
| 4,665,433 | 5/1987 | Hinson et al. | 358/22 |
| 4,962,419 | 10/1990 | Hibbard et al. | 358/37 |
| 5,260,888 | 11/1993 | Sharman | 364/724.05 |
| 5,298,981 | 3/1994 | Topper et al. | 348/630 |
| 5,374,995 | 12/1994 | Loveridge et al. | 358/447 |
| 5,392,137 | 2/1995 | Okubo | 358/462 |
| 5,430,499 | 7/1995 | Asada et al. | 348/628 |

FOREIGN PATENT DOCUMENTS

| | | | |
|---|---|---|---|
| 0 391 690 A1 | 4/1990 | European Pat. Off. | H04N 3/15 |
| 0 477 884 A2 | 9/1991 | European Pat. Off. | G06F 15/62 |
| 0 516 460 A2 | 5/1992 | European Pat. Off. | H04N 1/46 |
| 0 517 474 A2 | 6/1992 | European Pat. Off. | H04N 5/208 |
| 2 233 188 | 11/1987 | United Kingdom | H04N 5/253 |
| 94/22265 | 9/1994 | WIPO | H04N 5/208 |

*Primary Examiner*—David K. Moore
*Assistant Examiner*—Wenpeng Chen
*Attorney, Agent, or Firm*—Francis H. Boos, Jr.

[57] ABSTRACT

'X' shaped filters can be used as a basis for the enhancement of images derived by electronic scanning. However, whilst such filters offer the advantage that the horizontal and vertical edges of the image will be boosted in preference to the edges at 45°, they are not suitable for use where a different amount of enhancement is required horizontally and vertically as is the case when scanning an anamorphic film in a telecine. Described herein is a method of image processing in which the symmetry of the detail signal obtained from the 'X' filter can be modified by using a supplementary detail signal obtained from a linear filter to compensate for any asymmetry in the horizontal or vertical resolution of the original image.

5 Claims, 5 Drawing Sheets

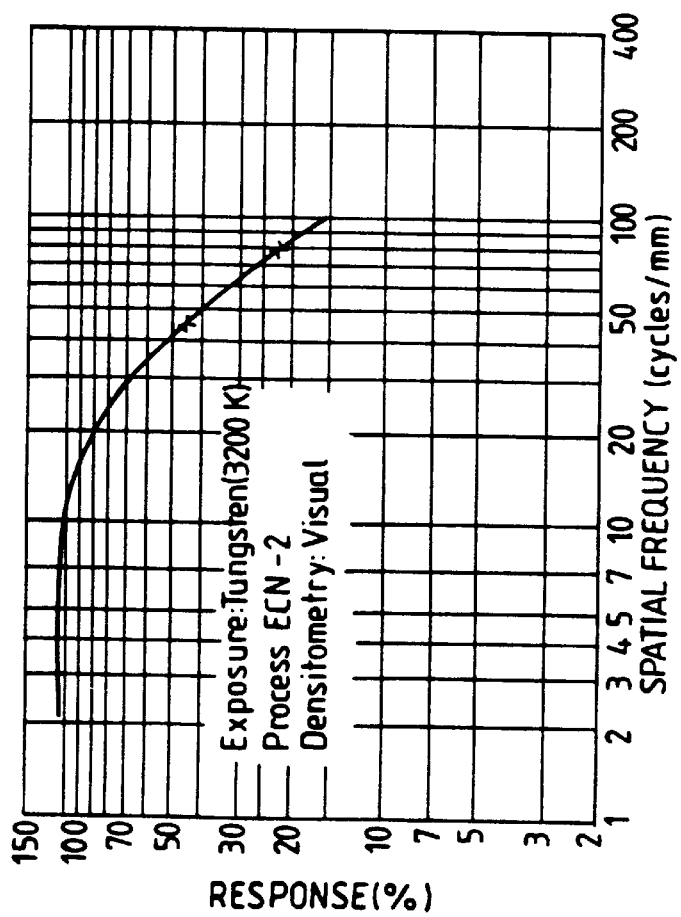
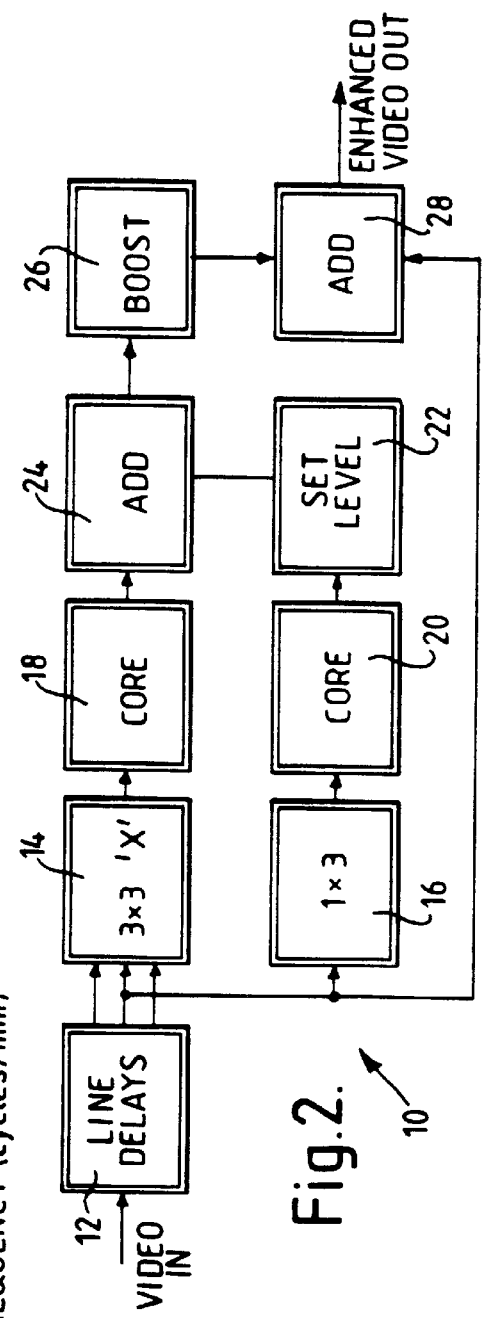
Fig.1.
Fig.2.

IMAGE PROCESSING TO COMPENSATE FOR ASYMMETRIC RESOLUTION

This is a Continuation of application Ser. No. 08/451,323, filed May 26, 1995.

FIELD OF THE INVENTION

The present invention relates to image processing and is more particularly concerned with the enhancement of images.

BACKGROUND OF THE INVENTION

Conventional enhancement of images in the form of video data in television has been carried out using separate horizontal and vertical high pass filters. This is achieved by passing the data through both filters in parallel and the filtered data is then added together to form a composite detail signal, rather than by using separable filters through which the signal data is passed in turn. An example of the separate horizontal and vertical filter approach is described in U.S. Pat. No. 4,962,419.

U.S. Pat. No. 4,962,419 discloses a signal processing network including a colour correction matrix and gamma compensation in which detail processing includes a detail extraction circuit for generating a detail signal from an un-matrixed green signal and a detail enhancement circuit for adding the detail signal to the matrixed, gamma-corrected red, green and blue signals. The un-matrixed green signal is converted to a gamma-corrected green signal and separately input to vertical and horizontal high pass filters which separate detail components representative of vertical and horizontal detail respectively. The vertical detail is additionally input to a horizontal low pass filter to eliminate excessive enhancement of diagonal image components. The detail components are cored and input to the detail enhancement circuit. As a result of bypassing the colour correction matrix and inserting the modified detail into the signal channel after gamma correction, the various detail components receive a substantially uniform visual enhancement regardless of orientation or density of the image.

However, using separate filters provides the ability for independent adjustment of the horizontal and vertical enhancement which evens out any source of asymmetry.

Alternatively, a single detail signal may be generated by the use of a centre pixel and its surrounding pixels to generated a square symmetric enhancement signal, as described in U.S. Pat. No. 4,941,190, or by the use of 'X' shaped filters to produce preferentially horizontal and vertical boosts, as described in co-pending patent application U.S. Ser. No. 037651 filed Mar. 22, 1993, now U.S. Pat. No. 5,374,995, and entitled *Method and Apparatus for Enhancing Sharpness of a Sequence of Images Subject to Continuous Zoom*.

'X' filters can be used as a basis for the enhancement of images derived by electronic scanning, such as, in television or computing. The use of such filters offers an advantage in that the horizontal and vertical edges of the image will be boosted in preference to edges at 45°. Furthermore, the image produced using 'X' filters will appear visually to be less grainy than an image sharpened using separate horizontal and vertical filters.

By using square symmetric or 'X' shaped filters, only one detail signal needs to be processed and higher levels of horizontal and vertical detail are obtained compared to diagonal detail. This is particularly true for 'X' filters.

The use of separate horizontal and vertical high pass filters, as described in U.S. Pat. No. 4,962,419, has the disadvantage that when the two detail signals are added together, the level of enhancement is at its maximum at 45° to the scanned lines. This is where the visual system has its minimum response. The result is a noisier image than need be the case for a given level of apparent sharpness.

Square symmetric and 'X' shaped filters have the disadvantage that when the image data is asymmetric, it is not possible to give the enhancement a symmetrical appearance.

Furthermore, 'X' filters alone are not suitable for use when a different amount of enhancement is required horizontally and vertically. This is the case encountered when scanning an anamorphic film in a telecine.

SUMMARY OF THE INVENTION

It is therefore an object of the present invention to provide a method of image processing which maintains the noise advantage obtained with 'X' filters whilst adding some of the advantage of separate filters to equalise the appearance of the enhancement.

In accordance with one aspect of the present invention, there is provided a method of enhancing an image data signal using a composite detail signal, the method comprising the steps of:

a) inputting an image data signal;

b) delaying the input image data signal to provide a plurality of delayed image data signals;

c) passing the delayed image data signals through a circularly symmetrical filter to provide a detail image signal;

d) passing the delayed image data signals through a unidirectional filter to provide a supplementary detail image signal;

e) adding the detail image signal to the supplementary detail image signal to form the composite detail signal; and f) adding the composite detail signal to a selected one of the delayed input image data signals.

In accordance with another aspect of the present invention, there is provided image processing apparatus for enhancing an input image data signal to provide an enhanced output image data signal, the apparatus comprising:

delaying means for delaying the input image data signal to provide a plurality of delayed input image data signals;

first filter means for filtering the delayed input image data signals to provide a detail image signal;

second filter means for filtering the delayed input image data signals to provide a supplementary detail image signal;

first adding means for adding the detail image signal to the supplementary detail image signal to form the composite detail image signal; and second adding means for adding the composite detail signal to a selected one of the delayed input image data signals.

Advantageously, the apparatus further includes level adjusting means for adjusting the level of the supplementary detail image signal in accordance with the detail image signal.

The first filter means may comprise a circularly symmetric filter. It is preferred that the circularly symmetric filter comprises an 'X' shaped filter.

The second filter means may comprise a unidirectional filter, and preferably comprises a linear filter.

By using a unidirectional filter in addition to a circularly symmetric filter, the symmetry of the detail signal may be modified to compensate for any asymmetry in the horizontal or vertical resolution of the original image. This can be achieved with less excess boost at 45° than is possible using separate horizontal and vertical filters.

In a preferred embodiment of the present invention, the circularly symmetric filter comprises an 'X' shaped filter. This means that the noise advantage obtained by using such filters can be maintained whilst giving the user the flexibility of the separate filter approach.

The method of the present invention generates a supplementary detail signal which can be added to the detail signal obtained from the 'X' shaped filter to form a composite detail signal which is used to increase preferentially either the horizontal or vertical component of the enhancement. The peak frequency of the supplementary detail signal should be at or close to the horizontal or vertical peak of the 'X' shaped filter in order to maintain a symmetrical appearance to the enhancement.

The supplementary detail signal could be cored to remove some of the noise/grain before being added to the derived enhancement signal from the 'X' filter to ensure that the noise/grain level of the final signal does not become objectionable.

The method of the present invention allows the horizontal-to-vertical symmetry of a detail signal to be adjusted whilst largely maintaining the noise advantage of the 'X' shaped filter approach.

BRIEF DESCRIPTION OF THE DRAWINGS

For a better understanding of the present invention, reference will now be made, by way of example only, to the accompanying drawings in which:

FIG. 1 illustrates a modulation transfer characteristic (response against spatial frequency) for a typical colour negative film;

FIG. 2 illustrates a block diagram of a processing system in accordance with the present invention;

DETAILED DESCRIPTION OF THE INVENTION

Figure 3:
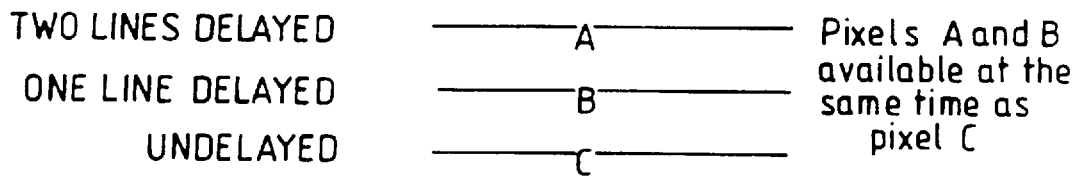
FIG. 3 illustrates delayed lines obtained from the line delay unit shown in FIG. 2.

The present invention is of particular applicability to the enhancement of a scanned anamorphic film image where the horizontal compression on the film is 2:1. In this specific case, correcting the compression of the scanned image produces a loss in definition which is due to the film. The modulation transfer function (MTF) for a typical colour negative film type, Eastman Kodak type 5247, made by the Eastman Kodak Company, is shown in FIG. 1. The limiting resolution, at the film plane, required for High Definition Television (HDTV) is approximately 45 cycles/mm for 35 mm film. From FIG. 1, it can be seen that the response at 45 cycles/mm is about 45% and the response at 90 cycles/mm, corresponding to a 2:1 anamorphic compression, is about 19%.

This means that after the image has been spatially processed to restore its correct aspect ratio, the MTF at the displayed spatial limit for the horizontal edges will be 45% whereas for the vertical edges it will be only 19%—a difference of around 2:1. An additional boost of ×2 to the vertical edges should restore the sharpness symmetry.

In a preferred embodiment of the present invention, an input video signal is passed through an 'X' shaped filter (circularly symmetric) to provide a circularly symmetric detail signal, and a linear filter, connected in parallel with the 'X' shaped filter, to provide a unidirectional detail signal. The unidirectional detail signal is added to the circularly symmetric detail signal to provide a composite detail signal which can be used to modify or correct the asymmetry of the input image data signal.

FIG. 2 shows a block diagram of a processing system 10 in accordance with the present invention. The system 10 comprises a delay unit 12, a circularly symmetric filter unit 14, a unidirectional filter unit 16, two coring units 18, 20, a set level unit 22, an adding unit 24, a boost control circuit 26 and a further adding unit 28. Filter units 14, 16 are arranged in parallel, as shown, with the respective coring units 18, 20 serially connected thereto.

Filter unit 14 and coring unit 18 provide the circularly symmetric detail signal. Filter unit 16 and coring unit 20 provide the unidirectional detail signal which is added to the circularly symmetric detail signal after having its level set in unit 22.

In the described embodiment, the circularly symmetric filter unit 14 comprises an 'X' shaped 3×3 filter, and the unidirectional filter unit 16, a 1×3 linear filter.

The first step of the method is to delay the video signal in the delay unit 12. Here the signal is delayed by one and two lines as shown in FIG. 3. This gives three data streams—the undelayed stream, the 'one line delayed' stream and the 'two lines delayed' stream—and provides at one time point, three pixels, A, B and C.

Figure 4:
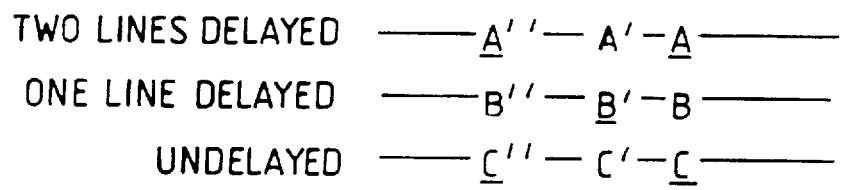
FIG. 4 illustrates a pixel array from which an 'X' detail signal and a linear detail signal are obtained in accordance with the present invention.

The line delayed signal streams are passed to the 'X' shaped filter unit 14 comprising a 3×3 filter, to derive a 3×3 circularly symmetric detail signal. FIG. 4 shows the pixel array where the number of pixel delays is indicated by the number of "'". The five pixels underlined, namely, A", A, B', C" and C, are the pixels required to generate the 3×3 circularly symmetric detail signal.

The line delayed signal streams are also utilised by the 1×3 linear filter unit 16. However, in this case, only the one line delayed stream is used. Pixels B, B' and B" are used to generate the unidirectional detail signal.

Figure 5:
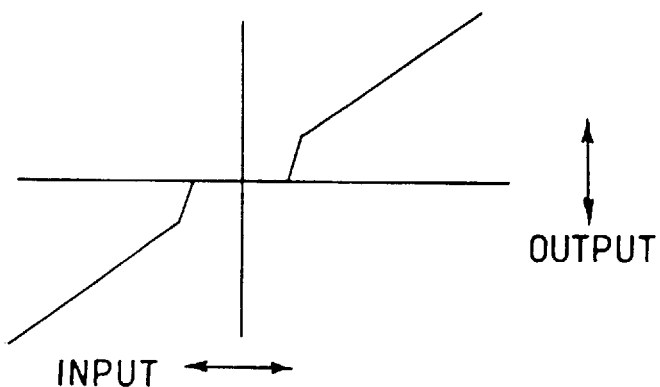
FIG. 5 illustrates the result of coring the detail signal.

The circularly symmetric detail signal and the unidirectional detail signal are then cored in respective units 18, 20 to remove low levels of noise and grain. An example of the cored signal obtained is shown in FIG. 5.

The level of the unidirectional detail signal can be set, with respect to the circularly symmetric detail signal, in set level unit 22, prior to being added to the circularly symmetric detail signal in unit 24 to provide a composite detail signal.

As shown in FIG. 2, the composite detail signal is then passed to adding unit 28 via boost control circuit 26. In the adding unit 28, the composite detail signal is added to one of the delayed image data signals to provide an enhanced video output signal which has been modified or corrected for any asymmetry in the input image data signal. In this particular case, the composite detail signal is added to the 'one line' delayed signal, but it will be readily understood that the composite detail signal could be added to any of the other delayed signals in accordance with the particular system used to implement the method of the present invention.

The boost control circuit 26 is used to alter the level of the composite detail signal which is added to the delayed input image data signal.

Figure 6:
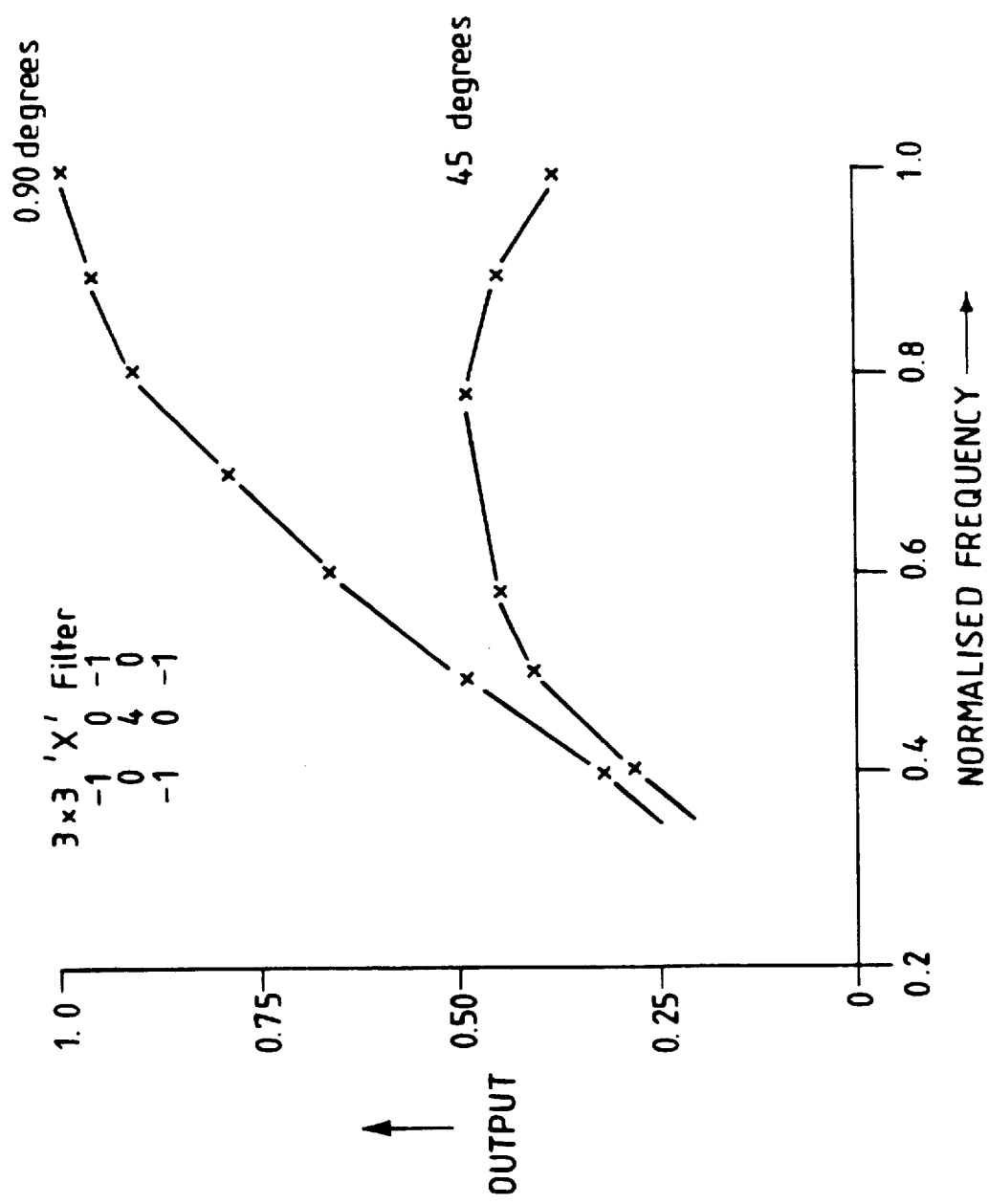
FIG. 6 shows the pass band characteristics of a 3×3 'X' shaped filter at 0°, 45° and 90°.
Figure 7:
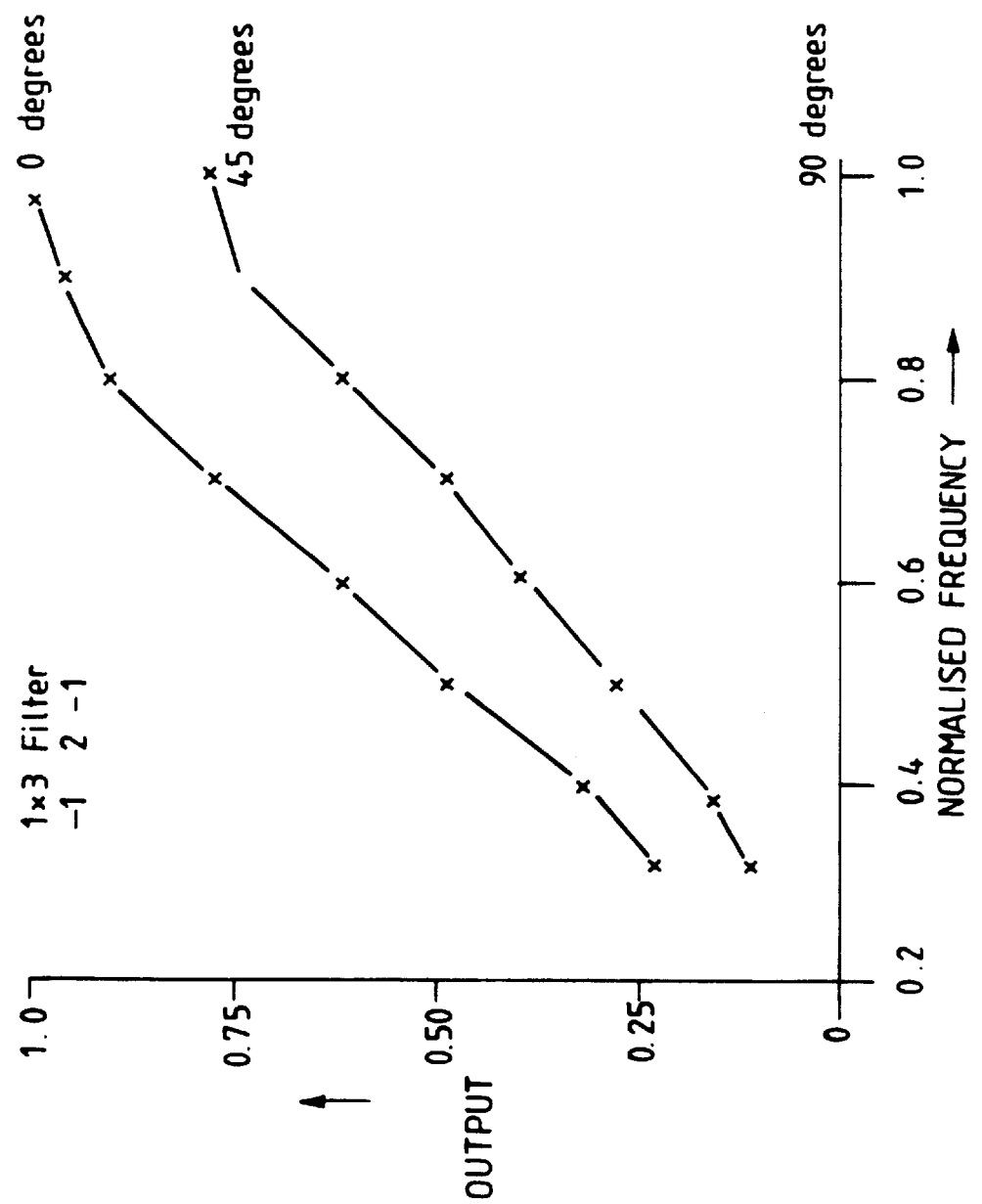
FIG. 7 shows the pass band characteristics of a 1×3 linear filter at 0°, 45° and 90°.

FIGS. 6 and 7 illustrate plots showing the pass band characteristics of the 3×3 'X' shaped filter unit 14 and the 1×3 linear filter unit 16 respectively to a sine wave test pattern oriented at 0°, 45° and 90° with respect to the filter array.

As can be seen from the amplitude characteristic of the 'X' filter unit (FIG. 6), the response at the maximum frequency is 1.0 at 0° and 90°, but only 0.3 at 45°. The 45° response does, however, rise to 0.5 at the Nyquist limit of the filter at 45°.

Similarly, from FIG. 7, it can be seen that the 1×3 filter unit has the same amplitude characteristic as the 'X' filter at 0°, but with a zero response at 90°. At 45°, the peak amplitude of the 1×3 filter is still 0.8 of its 0° response.

Figure 8:
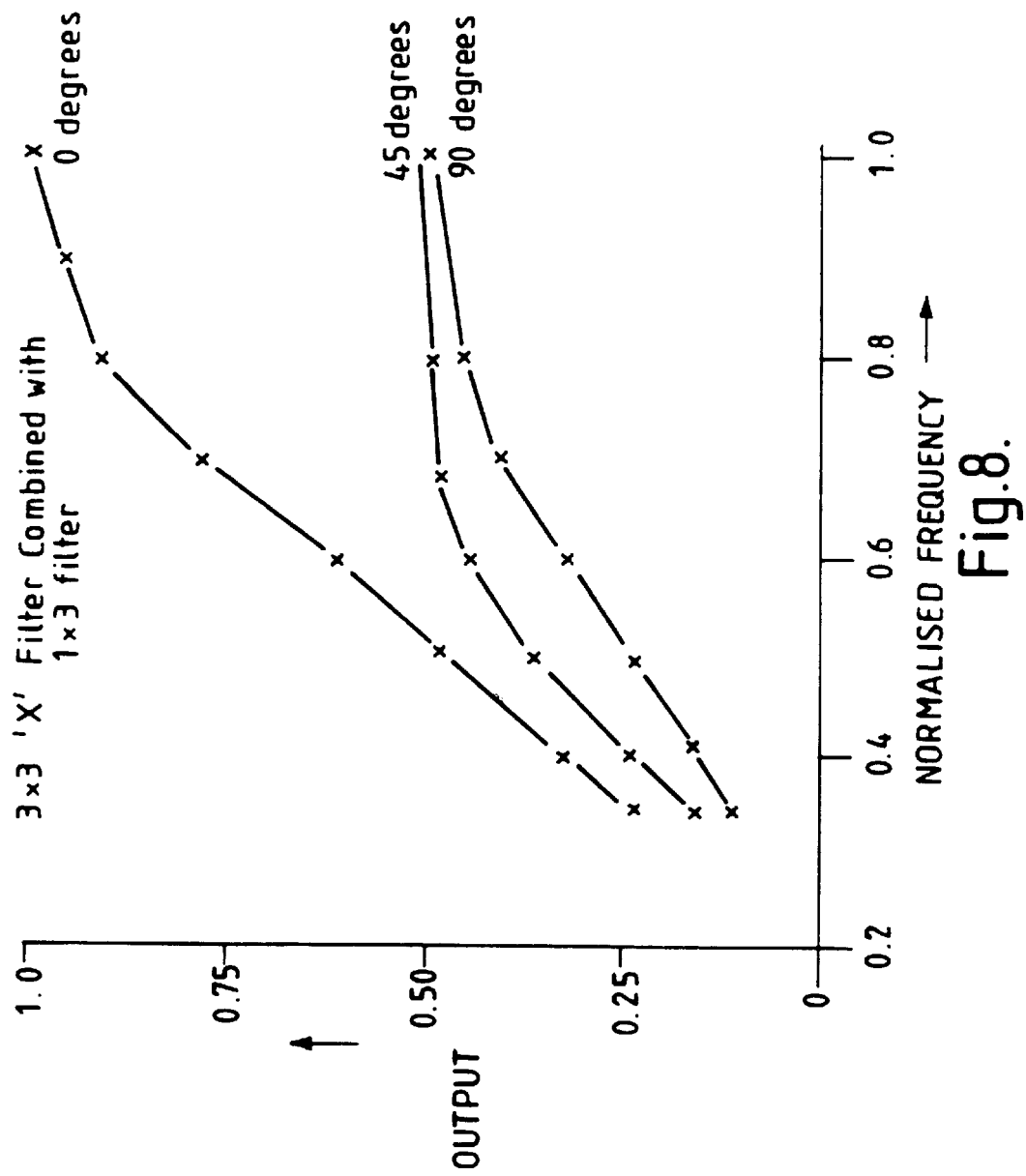
FIG. 8 shows the pass band characteristics of a combination of a 3×3 'X' filter and a 1×3 linear filter at 0°, 45° and 90°.

FIG. 8 shows the normalised shape of the composite characteristic assuming the proportions of the two filters are the same. This corresponds to an overall ×2 boost at 0° with respect to 90°. As can be seen, the amplitude of the 90° characteristic is half the amplitude of the 0° curve. The overall boost at 45° is calculated from the following:

For the 'X' filter (FIG. 6):

| angle (°) | boost |
| --- | --- |
| 0 | 1.0 |
| 45 | 0.5 (max) |
| 90 | 1.0 |

For the 1×3 filter (FIG. 7):

| angle (°) | boost |
| --- | --- |
| 0 | 1.0 |
| 45 | 0.8 |
| 90 | 0.0 |

In order to achieve the 2:1 ratio of responses at 0° and 90° using a combination of 'X' and linear filter techniques, half of each of the above is required to be added together to give a ×1 at 0° and ×0.5 at 90°:

| angle (°) | 'X' filter | 1 × 3 filter | Total |
| --- | --- | --- | --- |
| 0 | 0.50 | 0.50 | 1.00 |
| 45 | 0.25 | 0.40 | 0.65 (max) |
| 90 | 0.50 | 0.00 | 0.50 |

If the same calculation is carried out using just the linear filters to achieve the 2:1 ratio between 0° and 90°, the result is:

| angle (°) | 1 × 3 filter | 3 × 1 filter | Total |
| --- | --- | --- | --- |
| 0 | 1.00 | 0.00 | 1.00 |
| 45 | 0.80 | 0.40 | 1.20 |
| 90 | 0.00 | 0.50 | 0.50 |

As can be seen, the response at 45° for the two linear filters is somewhat higher than when using a combination of 'X' and linear filters. The visibility of the noise is proportional to the power of the noise and the power difference between the two values at 45° is over 3:1 providing a noticeable difference.

The unidirectional filter described above is a 1×3 linear filter which is used to boost or correct the loss in horizontal MTF compared to vertical MTF obtained in anamorphic films, that is, 2:1. It will be readily appreciated that any other suitable unidirectional filter may be used depending on the particular application.

The unidirectional detail signal could be derived from a filter unit which comprises two or more filters as described in U.S. Ser. No. 037651 discussed above. Alternatively, it could be derived from a single adjustable filter.

In a system where the required enhancement peak is the sum of two or more peaks, the unidirectional detail signal could be added to each of the main peaks in equal or differing proportions.

In a tracked enhancement-with-zoom system, as described in U.S. Ser. No. 037651 discussed above, the unidirectional detail signal could be tracked with the main enhancement 'X' filters either by building up the appropriate horizontal or vertical filter or by the sum of two or three filters.

The unidirectional detail signal, or its parts, could be separately cored or otherwise processed to remove small amplitude grain or noise before being added to any other detail signal.

The unidirectional detail signal could also be used in conjunction with a square symmetric filter or any other two-dimensional filter.

I claim:

1. A method of enhancing an asymmetric MTF image data signal using a composite detail signal to generate a symmetric MTF image data output signal, the method comprising the steps of:

a) inputting an asymmetric MTF image data signal having an amount of MTF loss in a first axis of the image relative to a second axis of the image;

b) delaying the input asymmetric MTF image data signal to provide a plurality of delayed asymmetric MTF image data signals;

c) passing the delayed asymmetric MTF image data signals through a circularly symmetrical filter to provide an asymmetric detail image signal;

d) passing the delayed asymmetric MTF image data signals through a unidirectional filter to provide a supplementary unidirectional detail image signal having an amount of MTF boost in said first axis which is complementary to said amount of MTF loss in said input asymmetric MTF image data signal;

e) adding the asymmetric detail image signal to the supplementary unidirectional detail image signal to form a composite asymmetric detail signal having an MTF asymmetry opposite to that of said asymmetric MTF input image data signal; and f) adding the composite asymmetric detail signal to a selected one of the delayed input asymmetric MTF image data signals to to convert said input asymmetric MTF image data signal to an enhanced output data signal having a symmetric MTF appearance.

2. A method according to claim 1, further including, prior to step e), the additional step of coring the asymmetric detail image signal.

3. A method according to claim 1 or 2, further including, prior to step e), the additional step of coring the supplementary unidirectional detail image signal.

4. A method according to claim 1, further including, prior to step e), the additional step of adjusting the level of the supplementary unidirectional detail image signal in accordance with the asymmetric detail image signal.

5. The method of claim 1 wherein said circularly symmetric filter is an "X" filter.

\* \* \* \* \*